US006361888B1

(12) United States Patent
Kriven et al.

(10) Patent No.: US 6,361,888 B1
(45) Date of Patent: Mar. 26, 2002

(54) TOUGHENING OF CERAMIC COMPOSITES BY TRANSFORMATION WEAKENING OF INTERPHASES

(75) Inventors: Waltraud M. Kriven, Champaign; Sang-Jin Lee, Urbana, both of IL (US)

(73) Assignee: The Board of Trustees of the University of Illinois, Champaign, IL (US)

( * ) Notice: Subject to any disclaimer, the term of this patent is extended or adjusted under 35 U.S.C. 154(b) by 0 days.

(21) Appl. No.: 09/234,172

(22) Filed: Jan. 19, 1999

(51) Int. Cl.$^7$ .................................................. B32B 9/00
(52) U.S. Cl. ....................... 428/701; 428/702; 428/698; 428/699; 428/404; 428/406; 428/293.4; 432/1
(58) Field of Search .................................. 428/698, 699, 428/701, 702, 293.4, 403, 404, 406; 432/1

(56) References Cited

U.S. PATENT DOCUMENTS

| 5,110,771 A | | 5/1992 | Carpenter et al. |
| 5,262,235 A | | 11/1993 | Heaney, III |
| 6,022,621 A | * | 2/2000 | McCarron, III et al. |

FOREIGN PATENT DOCUMENTS

EP 0470695 A 2/1992

OTHER PUBLICATIONS

"Microstructure and Interfacial Properties of Laser Ablation Coated, Fiber–Reinforced Ceramic Composite", *Ceramic Engineering and Science Proceedings*, 18[3] 1997, 105–112.*

"Possible Alternative Transformation Tougheners to Zirconia: Crystallographic Aspects," Kriven, Waltraud M., *Journal of the American Ceramic Society*, vol. 71, No. 12, Dec. 1988, 1021–1030.

"Combusion–synthesized β'–SiAlON reinforced with SiC monifilaments," Huang, Chao M.; Xu, Youre; Zhu, Dong; and Kriven, Waltraud M., *Materials Science and Engineering A188*, (1994), 341–351. No month.

"Displacive Transformations and their Applications in Structural Ceramics," Kriven, W.M. *Journal de Physique IV, Colloque C8, supplement au Journal de Physique III*, vol. 5, Dec. 1995, C8–101–110.

"Microstructure Interfacial Properties of Laser Ablation Coated, Fiber–Reinforced Ceramic Composite," *Ceramic Engineering and Science Proceedings*, 18[3] 1997, 105–112. No month.

"Design of Oxide Composites with Transformation Weakened Debonding Interphases," Kriven, W.M. and Lee, S.J., Jan. 22, 1998.

"Mullite/Cordierite Laminates with β→α Cristobalite Transformation Weakened Interphases," Kriven, W.M. and Lee, S.J., *Cer. Eng. and Sci. Proc.* 19 [3–4] (1998) 1–12. No month.

* cited by examiner

Primary Examiner—Deborah Jones
Assistant Examiner—Wendy Boss
(74) Attorney, Agent, or Firm—Woodard, Emhardt, Naughton, Moriarty & McNett

(57) ABSTRACT

Generally, this invention provides a toughened ceramic composite and a method of enhancing the mechanical strength of ceramic matrix composites through use of a transformation weakened interphase material. The ceramic composite provided in this invention includes a ceramic matrix, a second material as a second phase, and a metastable interphase material. The metastable interphase material is positioned between the ceramic matrix and the second phase material. The ceramic composite can include reinforcing elements such as fibers, whisker-shapes, platelets and particulates or have laminated or fibrous monolithic geometries. The metastable interphase material is capable of undergoing a shear or stress induced zero volume or negative volume, martensitic phase transformation, which may or may not be accompanied by a crystallographic unit cell shape change. In one embodiment, the metastable interphase material includes β-cristobalite.

31 Claims, 16 Drawing Sheets

TOUGHENING OF CERAMIC COMPOSITES BY TRANSFORMATION WEAKENING OF INTERPHASES

GOVERNMENT RIGHTS

The U.S. Government has paid-up rights in this invention and the right in limited circumstances to require the Patent Owner to license others on reasonable terms as provided by the terms of Contract No. AFOSR 49620-96-1-0464 awarded by the U.S. Air Force Office of Scientific Research.

BACKGROUND OF THE INVENTION

This invention relates to a ceramic matrix composite and to a method of decreasing the brittleness of ceramic matrix composites. More specifically, this invention is directed to a ceramic matrix composite having a potential debonding interphase and to a method of strengthening ceramic matrix composites by lattice deformational transformations of interphases.

The brittleness and unreliability of ceramics in certain applications continue to present difficult and unsolved problems. The aerospace, automotive and aviation industries are but a few examples of industries that are searching for enabling technology to introduce new types of ceramics that are tough, flaw tolerant and exhibit graceful failure and creep resistance for both ambient and high temperature applications. Typical applications include components in turbine engines, cylinder sleeves for gasoline engines and structural components.

Recent trends in the ceramics research have been to reinforce brittle ceramic matrices with higher elastic modulus fibers, platelets, particulates, or whisker-shaped reinforcing elements embedded in the matrix. The reinforcing elements impart additional strength to the ceramic matrix. The additional strength is necessary to maintain the structural integrity of the ceramic matrices, particularly upon stress or shear-induced defects. These embedded reinforcing elements constitute large amounts of interfacial surface inside the ceramic composite. The deflection of a crack along such an interface causes separation of the interface due to the action of an impinging crack and is an important mechanism for enhancing the fracture toughness of the ceramic matrices. In a fiber-reinforced matrix, for example, the advancing crack can directly advance through the fiber potentially destroying the ceramic or it can debond along the interface and inhibit fiber failure. If debonding occurs, then the intact fibers will allow crack bridging and eventual fiber pull-out, thus giving rise to increased toughness of the composite.

It has been demonstrated that extensive fiber pullout can be induced by formation of a weak interphase layer between the fiber and the ceramic matrix. This has led to investigations of a variety of composites with coated fibers. This type of interfacial debonding mechanism of toughening has clearly been demonstrated in SiC materials reinforced with SiC fibers that were previously coated with a thin layer of compliant graphite (C) or boron nitride (BN). Toughness values of up to 30 MPa m$^{1/2}$ have been reported for the graphite system when it operates under vacuum and ambient temperature. Alternating laminates of silicon carbide (SiC) and graphite have also functioned well in controlled oxygen deficient atmospheres. However, for high temperature applications (greater than 1200° C.), for extended use (greater than ten hours), or in air or oxidizing environments, both silicon carbide and graphite are chemically unstable and decompose to silica ($SiO_2$) and gaseous species, e.g., carbon monoxide (CO). The resulting ceramic body is left porous, friable and weak.

An alternative system that has been proposed to replace carbon or boron nitride coatings around oxide fibers is based on micaeous cleavage material such as fluorophlogopite or β alumina/magnetoplumbite. More recently, lanthanide phosphates ($LnPO_4$) type compounds such as monazites (e.g. $LaPO_4$ or zenotimes such as yttrium phosphate ($YPO_4$) have been introduced as oxidation resistant weak interfaces capable of operating up to 2000° C. in air.

One shortcoming of the interface slippage mechanism operating in the monazite-type systems is that it relies on the fiber preserving a smooth and clean interface. This places a stringent requirement on the manufacture and handling of the fiber and hard-to-control restrictions on its subsequent change in surface microstructure during prolonged service at high temperatures.

Current methodologies to reduce the brittleness of ceramics also include transformation toughening of ceramic composites by providing an interphase material embedded in the ceramic composite that undergoes a physical change upon mechanically induced stress. One such system investigated includes zirconia ($ZrO_2$). Zirconia undergoes a tetragonal to monoclinic phase transformation. The tetragonal to monoclinic phase transformation for zirconia is considered to be martensitic in bulk and is accompanied by a volume increase of about 3% at 950° C. and about 4.9% at room temperature. The transformation is notorious for causing unstabilized zirconia to shatter. However, these properties can be utilized to enhance the mechanical properties of a ceramic matrix that includes zirconium oxide particles.

It is known that a fine-grain material, for example, alumina, can be toughened by dispersions of randomly oriented intergranular, irregularly shaped zirconium oxide particles (ZTA). The mechanism of transformation toughening is attributed to energy dissipation of the propagating crack by the tetragonal to monoclinic transformation in the crack tip stress field, followed by the exertion of closure forces on the crack resulting from the volume expansion experienced by transformed $ZrO_2$ particles lying in the transformation zone of the crack. Mechanical properties of zirconium oxide, such as toughness and thermal shock resistance, are significantly improved and fracture of the material is retarded. However, use of zirconium oxide particles embedded in ceramic matrixes only yields about three to four-fold improvement in the strength of ceramics. Much greater strength improvements are required before ceramics can replace alloys currently used in the aerospace, aviation and automotive industries. Thus, there remains a need of less brittle ceramic composites that can be used to replace the metals and alloys currently used.

SUMMARY OF THE INVENTION

Thus, there is provided in accordance with the present invention a ceramic composite. The composite comprises a ceramic matrix that includes at least a first ceramic material; the composite also comprises a second phase, which includes second material, and an interphase material. The interphase material is positioned between the ceramic matrix and the second phase material. The interphase material includes a metastable ceramic oxide that is compositionally stable under the processing conditions to form the ceramic material. Preferably, the metastable ceramic is compositionally stable at a temperature of from at least about room temperature to about 2000° C. In one embodiment, the metastable ceramic includes β-cristobalite. The metastable ceramic is capable of undergoing a stress induced, zero volume or negative volume transformation, which may or may not be accompanied by a unit cell shape change.

There is also provided in the present invention a method of preparing a toughened ceramic composite. The method comprises bonding a first ceramic material to a transformable interphase material. The transformable material is capable of undergoing a martensitic, zero volume or negative volume, unit cell shape change under shear or stress conditions. The transformation may or may not be accompanied by a unit cell shape change. A second phase material also is bonded to the interphase material. The second phase material can be a ceramic such as the first ceramic material to provide a laminate or the second phase material can be provided as a reinforcing element (e.g., fiber, platelet) in the ceramic composite. The ceramic composite can also include a second interphase material in addition to the first ceramic material, the transformable interphase material and the second phase material. The second interphase material includes a transformable material that is capable of undergoing a positive volume change, martensitic phase transformation under shear or stress conditions.

In another aspect of the invention there is provided a method of enhancing the strength of a ceramic composite by forming an interphase material between a first ceramic matrix and a second phase material. The interphase material comprises a metastable ceramic oxide that is capable of generating stress induced microcracks within the interphase material. The interphase material deflects a stress default in the ceramic composite by a zero volume or negative volume phase transformation, which may or may not be accompanied by a unit cell shape change.

DETAILED DESCRIPTION OF THE PREFERRED EMBODIMENTS

Figure 1:
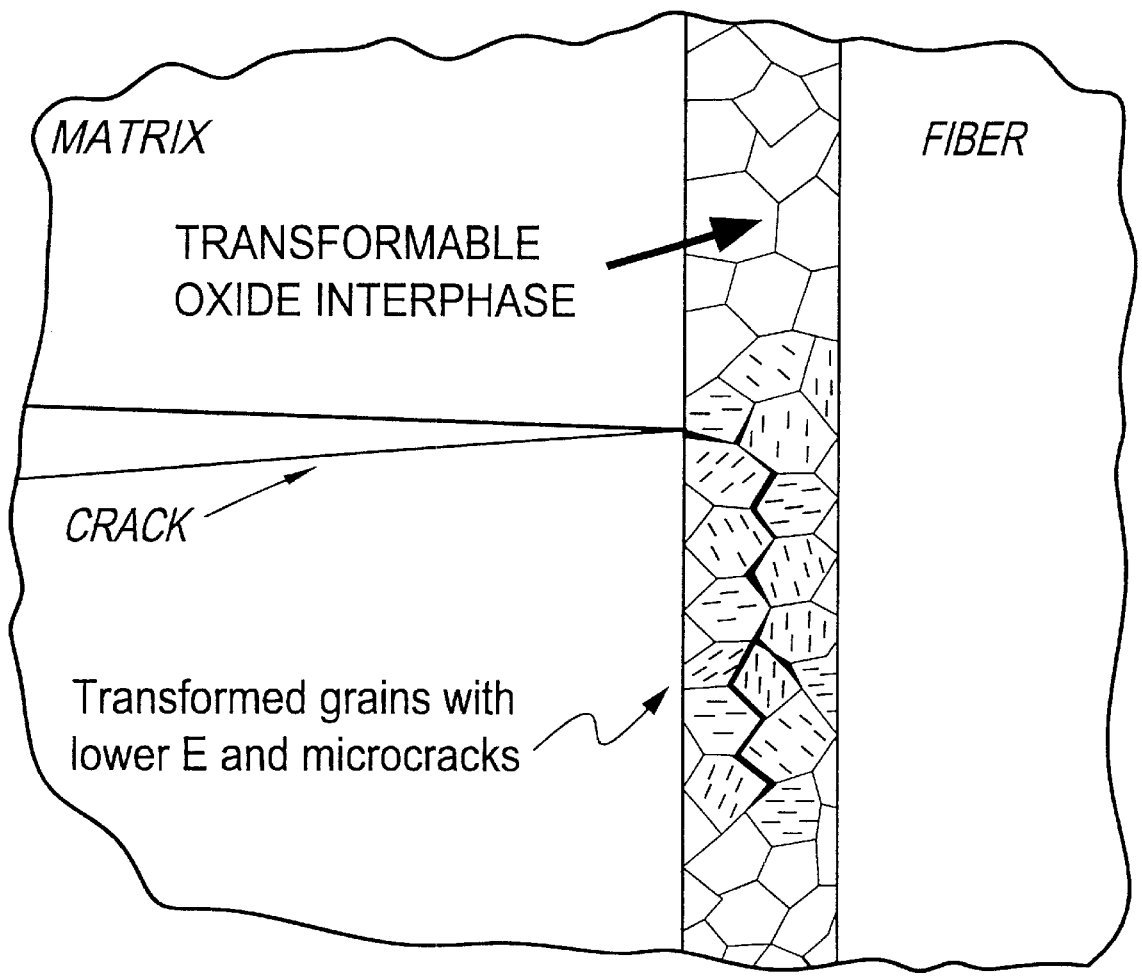
FIG. 1 is a diagrammatic illustration of a transformable interphase undergoing a displacive phase transformation.

For the purposes of promoting an understanding of the principles of the present invention, reference will now be made to certain embodiments, and specific language will be used to describe the same. It will nevertheless be understood that no limitation of the scope of the invention is intended thereby. Any alterations and further modification in the described processes, systems or compositions, and any further applications of the principles of the invention as described herein are contemplated as would normally occur to one skilled in the art to which the invention relates.

Generally, this invention provides a toughened ceramic composite and a method of enhancing the mechanical strength of ceramic matrix composites through use of a transformation weakened interphase material. The ceramic composite provided in this invention includes a ceramic matrix, a second material as a second phase and a metastable interphase material. The metastable interphase material is positioned between the ceramic matrix and the second phase material. The ceramic matrix composite can include a reinforcing material such as fibers, platelets, particulates, or whisker-shaped phases as the second phase material. The reinforcing material is embedded in the first ceramic matrix to enhance the mechanical strength of the composite. Preferably the interphase material provides a coating surrounding the reinforcing material, which can be fibers, whisker-shapes, platelets or a particulates. Preferably, the interphase material is a transformation-weakened interphase that is capable of undergoing a stress-induced phase transformation, e.g. a unit cell shape change, which includes a zero volume or negative volume transformation. Stress induced defects induce localized debonding in the interphase material, which dissipates crack energy. This results in loss of elastic modulus, toughening and strengthening of the ceramic matrix. The interphase material also deflects a crack propagating towards it, trapping the propagating crack within the interphase material rather than through the bulk of the ceramic matrix or the reinforcing material. The intact reinforcing material such as fibers bridge cracks and support the ceramic composite. Furthermore, debonding within the interphase permits interfacial debonding between the bulk ceramic matrix and the reinforcing material. The interfacial debonding permits eventual fiber pullout, thus giving rise to increased toughness of the composite.

The method of enhancing the mechanical strength of ceramic matrix composites uses a viable debonding mechanism in a weakened interphase material that is useful in a wide variety of ceramic matrices. The debonding operates as an effective "crack trap" that dissipates stress energy through a weakened interphase by a number of energy absorbing mechanisms resulting in significant toughing, low reduction in strength, high temperature operation in an oxidative atmosphere, self healing properties and reduced sensitivity to fatigue. Furthermore, use of this present invention can be combined with the transformation toughening mechanism of the zirconia to provide ceramic composites with sufficient toughness to rival metals and super alloys used for automotive, aerospace and aviation applications.

The ceramic composite includes an interphase material. The interphase material may be dispersed within the ceramic matrix or may be positioned between the ceramic matrix and a second phase material of the ceramic matrix composite. The interphase material is selected to be a metastable ceramic capable of undergoing a shear or stress-induced martensitic or displacive zero volume or negative volume phase transformation. This may or may not be accompanied by a unit cell shape change.

The metastable ceramic for use in this invention is preferably ceramic oxide. Metastable ceramic oxides prepared in accordance with this invention are particularly useful for high temperature applications in an oxidative environment. However, other ceramic materials such as carbides, borides, and nitrides that are capable of undergoing the stress-induced martensitic or displacive phase transformation with a negative volume change or large shape change can also be included in this invention. The metastable ceramic is a polymorphic ceramic that exists in a variety of phases depending upon the physical conditions used to prepare the ceramic. The metastable ceramic is prepared from a polymorphic ceramic that can exist in a first phase or parent phase at a first temperature and in a second phase at a second temperature lower than the first temperature. The first phase has a volume that is equal to or larger than the volume of the second phase.

The polymorphic ceramic undergoes a phase transformation from the first phase to the second phase at the transformation temperature, $T_0$ This transformation is reversible. Often for a given polymorphic ceramic, the actual transformation temperature, $T_0$, will vary because of hysteresis. Thus, a given polymorphic material may undergo a phase transformation from a first phase to a second phase at the first transformation temperature as the material is heated up, and the same material may under a transformation from the second phase to the first phase at a second transformation temperature lower than the first temperature as the material is cooled down.

The metastable ceramic is prepared from the polymorphic ceramic by stabilizing the first phase at a temperature below the transformation temperature. The first phase of the polymorphic ceramic can be stabilized by one or more of the following parameters: 1) providing a confining crystalline or amorphous matrix constraint; 2) modifying the chemical composition of the metastable ceramic or doping effects; and 3) preparing the polymorphic ceramic at a critical particle size to control the onset of nucleation of the transformation. At a temperature above To the polymorphic ceramic can be imbedded in a matrix that constrains the ceramic to remain in the first phase as the ceramic is cooled to a temperature lower than To. Any chemically compatible ceramic can be used. Specific examples of oxide ceramics that can constrain the first phase include: alumina, mullite, cordierite, forsterite and titania. Alternatively, the first phase can be stabilized by the addition of chemical dopants or "stuffing cations". The stuffing cations are added to chemically stabilize the polymorphic ceramic in a first phase. Examples of cations that can be used with this invention include: Groups IA, IIA, IIIA, IVA, Group B cations and lanthanide cations, for example, cations of lithium, aluminum, calcium, boron, magnesium, manganese, and yttrium.

The first phase can also be thermally stabilized by preparing polymorphic ceramics to have a selected particle size. The selected particle size can be prepared by optimally aging the ceramic at temperatures higher than the $T_0$ temperatures. Overaged grains exceeding their critical particle size transform spontaneously on cooling through their transformation temperature. Optimally aged grains can be metastably retained down to room temperature, but can be induced to transform through the action of shear or tensile stresses.

Preferably, the metastable ceramic is thermally stable under high-temperature conditions. This is important for use in, for example, turbine engines and in the aerospace industry. Typically, the operating temperatures for aerospace components are between about 600° C. and about 2000° C.

The neutral or negative volume transformation is reversible. Prolonged heating of the metastable ceramic above $T_0$ to the high temperature volume expanded, parent phase can produce crack healing and restore an essentially dense and untransformed interphase in substantially pristine condition. Thus, the toughened ceramic can be "self healing" when recycled above the transformation temperature.

The metastable ceramic must be compositionally stable under the processing conditions used to compare and shape the ceramic composite. Optimally the ceramic composite for use in the present invention can be prepared by methods commonly used in the art. Typical bulk processing methods include sintering, hot pressing, hot isostatic pressing, co-extrusion and injection molding. Coating techniques for reinforcing elements include dip coating, sol gel coating, chemical vapor deposition (CVD) and pulsed eximer laser ablation (PELA). These processes provide a toughened ceramic as a ceramic composite, a reinforced matrix, a laminate or a fibrous monolith. Generally ceramic processing methods require high temperatures. Therefore, it is important to ensure that the components of the ceramic composite are compositionally stable at the high processing temperatures. Preferably, the components of the ceramic composite are compositionally stable up to at least 1,650° C. to about 2,000° C.

Specific examples of metastable ceramics for use in the present invention are β-cristobalite and β-aluminum phosphate ($AlPO_4$). The beta phase of cristobalite, which is usually observed above 265° C., can be stabilized down to room temperature. When subjected to a shear or stress force, such as a propagating crack, the β-cristobalite undergoes a displacive, possibly martensitic transformation. A similar, isostructural transformation occurs in pure or doped aluminum phosphate.

Beta-cristobalite is a high-temperature, low-pressure polymorph of silica ($SiO_2$) in which the $SiO_4$ tetrahedra are arranged in a diamond-like lattice with shared corners. The β-cristobalite has cubic symmetry while the alpha-cristobalite has tetragonal symmetry. The fully expanded, high-temperature, beta structure undergoes a reversible, displacive transformation to a collapsed alpha structure on cooling at about 265° C. This transformation is accompanied by a volume decrease of approximately 3.2%. The temperature of the alpha-to-beta inversion in cristobalite is variable and depends upon the crystal structure of the starting material. In order to stabilize the β-cristobalite down to room temperature, it can be chemically doped with "stuffing cations" such as $Ca^{2+}$ and $Al^{3+}$. In particular, in the calcia-alumina-silica ($CaO$—$Al_2O_3$—$SiO_2$) system, the molar ratio of calciumoxide to alumina is one in which the aluminum occupies a silicon at tetrahedral sites, while the calcium ion occupies all the interstitial, non-framework sites. The presence of foreign ions in the interstices retards the contraction of the structure, which would normally occur between the alpha to beta cristobalite transformation at about 265°. Chemically stabilized cristobalite contains CaO and $Al_2O_3$ as dopants, and has cubic rather than tetragonal symmetry at room temperature.

It has been determined that it is important to control the metastable material to a particle size capable of undergoing the stress-induced phase transformation. For example, a particle size effect controls the beta-to-alpha transformation in the metastable β-cristobalite. In general, a large particle size favors the spontaneous formation of the low-temperature phase upon cooling, and a small particle size stabilizes the high-temperature phase even at ambient temperature. Thus, a desired particle size exists for a given transformation, which depends upon densification temperature and annealing time. In practice, particle size is an important factor to control the transformation weakening characteristics of the ceramic matrix.

The desired particle size for a given metastable ceramic material may be readily determined. In general, the grain size can be increased by annealing the ceramic material at high temperature for longer times. For example, the ratios of alpha/beta cristobalite phases and the average grain size show an increase with increasing annealing time. The series of ceramic samples can be annealed for differing annealing times. After cooling, the samples can be ground to induce the displacive phase transformation. Examination of the resulting ground samples using x-ray deffractiometry and a scanning electron microscope (SEM) would reveal the microstructures and microcracks resulting from the phase transformation. The desired particle size is determined iteratively by annealing, then SEM and x-ray diffraction studies, according to methods developed in zirconia transformation studies by W. M. Kriven in J. Am. Ceram. Soc. 71 1021–1030 (1988) and references cited therein, which are incorporated in their entirety herein.

Protoenstatite ($MgO.SiO_3$) is another specific example of a metastable ceramic oxide useful with the present invention. Reports of a ceramic matrix composite prepared as a fibrous monolith material comprising protoenstatite have recently been disproved. (See W. M. Kriven "Displacive Transformations and their Applications in Structural Ceramics" Journal de Physique IV, Colloque C8 (Dec) 101–110 (1995); and D.Zhu, H. Chung, M. H. Jilavi and W. M. Kriven "Microstructure and Interfacial Properties of Laser Ablation Coated, Fiber-Reinforced Ceramic Composite" Ceramic Engineering and Science Proceedings 18(3) 105–112 (1997). The fibrous monolith material was formed by a co-extrusion technique. Under the processing conditions used to form the fibrous monolith material, the protoenstatite ($MgO.SiO_3$) decomposed to $SiO_2$. It was determined that enstatite decomposes to $SiO_2$ at temperatures up to about 1150° C. to about 1200° C. in an effectively reducing atmosphere (e.g. vacuum, $N_2$ or Ar) of low oxygen partial pressure. The loss of MgO contributed to the interphase weakening rather than a stress induced martensitic, displacive transformation. Alternative methods of providing a ceramic matrix composite comprising protoenstatite such as tape casting and low temperature sintering in air to eliminating a non-reducing atmosphere could be used.

Enstatite, a magnesium metasilicate ($MgO.SiO_3$), is a pyroxene chain silicate. The relationship between the polymorphs is that the protoenstatite (PE) of orthorhombic symmetry, transforms to monoclinic clinoenstatite (CE) structure on rapid quenching below 865° C. On slow cooling to ambient temperature, however, orthorhombic orthoenstatite, (OE) forms at 1042° C. The orthorhombic (PE) to monoclinic (CE) transformation is accompanied by a unit cell volume decrease of 5.5%, as well as a unit cell shape change of 18.3°.

The ceramic matrix composite for use in the present invention also includes a ceramic matrix. The ceramic matrix can be selected from a number of known intermetallic materials and ceramic oxides, borides, nitrides, and carbides. Examples include mullite, cordierite, and alumina. Preferably, the ceramic material is a ceramic oxide. It is preferable that the ceramic material be selected to have a coefficient of thermal expansion that is compatible with that of the metastable ceramic. Correct matching of the coefficient of thermal expansion values of the ceramic and the metastable ceramic prevents delamination of the ceramic matrix and the metastable ceramic upon heating or cooling. Furthermore, the coefficient of thermal expansion for the ceramic matrix can be modified by combining it with other ceramic compounds or doping agents. Such techniques are well known to those in the art. Therefore, the ceramic matrix can comprise more than one ceramic material or ions to modify the bulk coefficient of thermal expansion of the matrix.

One example of a ceramic material suitable for the ceramic matrix of the present invention is mullite. Mullite can be used as a sole ceramic matrix or it can be mixed with a number of other ceramic materials. One particularly advantageous ceramic matrix for use in the present invention includes a 60% mullite and a 40% cordierite mixture. It was determined that the 60/40 mullite/cordierite mixture produced a ceramic matrix that had a coefficient of thermal expansion value closer to the value of the coefficient of thermal expansion for β-cristobalite.

The ceramic composition of the present invention also includes a second phase material. The second phase material includes a reinforcing component. Alternatively, the second phase can include a polycrystalline ceramic composition (e.g. in fibrous monolithic configuration). When the second phase comprises a reinforcing component, the reinforcing component can be formulated as a fiber, particulate, platelet, or whiskered-shaped reinforcement. A reinforcement particularly useful in the present invention includes a fiber or a fiber weave. Examples of fibers include ceramic oxide fibers such as single crystal sapphire ($Al_2O_3$), mullite ($3Al_2O_3.2SiO_2$) and yttrium aluminum garnet ($Y_3Al_5O_{12}$ or YAG) fibers. These fibers are available from Saphicon, Inc. of Milford, N.H. Polycrystalline alumina-mullite fibers (Nextel 720) can be obtained from 3M Company of Saint Paul, Minn. Amorphous fibers can also be produced by a laser-melting, containerless technique from Containerless Research, Inc. of Evanston, Ill. Other materials that can be used for fiber include silicon carbide, glass, quartz, metal, and other crystalline oxide ceramic or mineral compositions (e.g. calcium aluminate ($CaO.Al_2O_3$), forsterite ($2MgO.SiO$) and hydroxy-apatite ($3Ca_3(PO_4)_2.Ca(OH)_2$)). The fibers for use in the present invention must be able to withstand the processing temperatures used to produce the ceramic matrix composite.

In one embodiment, the ceramic matrix composite of this invention can include a ceramic laminate. Typically, the laminate is provided as a plurality of layers. The ceramic matrix can include a first layer that comprises a first ceramic matrix. The second phase material can include a second layer that comprises a second ceramic matrix. The interphase material is positioned between the first and second layers. The second layer can be, but is not required to be, substantially the same as the first layer. In preferred embodiments, the laminate includes a plurality of alternating first and second layers. The first and second layers are separated by interphase material.

Alternatively, the second phase material can include a second ceramic composite. Typical examples of a ceramic composite matrix composite that includes two phases include a ceramic laminate. In a ceramic laminate, the second phase can be substantially the same as the ceramic matrix composite or the second phase material can be different from the ceramic matrix composite. Use of a laminate for the ceramic matrix composite that includes alternating layers of the ceramic materials includes an interphase material positioned between the alternating ceramic layers. In preferred embodiments, the laminate includes a first ceramic matrix separated from the second ceramic matrix by the metastable interphase material.

In another embodiment, the ceramic matrix, the second phase material or both can include a transformation toughener material. The transformation toughener material undergoes a stress induced martensitic, positive volume change transformation, which may be accompanied by a unit cell shape change. Examples of materials for use as transformation tougheners have been discussed in W. M. Kriven, "Possible Alternative Transformation Tougheners to Zirconia: Crystallographic Aspects" J. Am. Ceram. Soc. 71(12) 1021–1030 (1988) and references therein which are incorporated herein in their entirety. The transformation toughener material can be dispersed within the ceramic matrix composite, provided as distinct phases within the ceramic matrix or the second material phase. Examples of transformation tougheners include $ZrO_2$, $Dy_2O_3$, $Tb_2O_3$, $2CaO.SiO_2$, and $2Ln_2O_3.Al_2O_3$.

In yet another embodiment, the ceramic composite can include a thermally inducible transformation phase. In a thermally inducible transformation, a metastable ceramic spontaneously transforms on cooling through its transformation temperature. This provides a ceramic composition with a phase that has already transformed at room temperature. This transformed phase may include microcracks, which help to dissipate additional shear or stress energy. Examples of thermally inducible metastable ceramics include overaged cristobalite, enstitate and alumina phosphate. Overaged ceramics can be prepared by prolonged annealing at the annealing temperatures to provide ceramics having particle sizes that are greater than the desired particle size for shear or stress inducible transformation ceramics.

This invention also provides a method of strengthening ceramic matrix composites by providing a weakened phase in the ceramic composite that serves as a "crack trap". A mechanism is schematically illustrated in FIG. 1. The weakened phase includes a shear-induced transformable material. The transformable material changes its phase, i.e., crystal structure change involving a crystallographic unit cell shape change and/or negative cell size change, when subjected to physical force or stress such as a propagating crack. Preferably, the phase transformation provides a sufficient unit cell change to induce localized microcracks in the interphase material. The phrase transformation can include a neutral or small negative volume change and a unit cell shape change or a more pronounced negative volume change with or without a unit cell shape change. This phase transformation creates microcracks in the bulk phase containing the transformable material. The transformable material diverts the impinging crack from proceeding through the adjacent reinforcement fiber.

While not intending to be bound by any theory, creation of the microcracks serves as a potential synergistic toughening of the ceramic composites. Several toughening mechanisms become operative. These include: 1) Energy dissipation by creation of new surfaces as microcracks; 2) In the shear-induced case, crack energy is used to overcome activation energy barrier and nucleate the transformation; 3) Frictional work is done by the crack as it debonds from the reinforcement and passes through the weakened interphase; and 4) Load bearing by the fiber, with subsequent crack closure forces exerted on the main matrix crack, grain bridging, e.g., in the case of interphase coated reinforcement (fiber, particulate, platelet or whisker).

The shear, stress-induced transformation may be an extremely powerful toughening mechanism. In the as-fabricated state, the composite has a maximum bulk strength and, specifically, transverse strength, in directions perpendicular to fiber lengths. Should a matrix crack approach the fiber, it induces transformation weakening in the interphase, but only in the immediate environment of the crack, rather than in all interphases throughout the bulk of the material as occurs in thermally induced transformations. During long-term use, the fatigue properties are not expected to deteriorate rapidly, since the transformation damage is localized to the interphase and is beneficial for toughening. If crack healing in the interphase does occur during prolonged use at high temperature, a useful feature is to be able to recycle the interphase. Heating above the transformation temperature, To, to a high temperature, should produce crack healing and restore an essentially dense and untransformed interphase in the almost-pristine condition—in the volume-expanded, parent phase. Therefore, for high-temperature applications, the maximum use temperature is set by the transformation temperature, $T_0$, which, in the case of displacive or martensitic transformation is known to vary by hysteresis for a given system. The transformation weakening effect is expected to operate over a range of temperatures up to about $T_0$, provided that the microstructure of the interphase is designed properly. Factors such as interphase thickness, grain size, and composition, need to be carefully controlled and maintained during the prolonged annealing at elevated temperatures. The interphase needs to have a stable phase equilibrium with adjacent matrix and reinforcement compositions. For a shear, stress-induced transformation, the critical particle size of an interphase will need to be preserved, e.g., by the addition of chemically compatible, non-transformable second phases to inhibit grain growth. In the case of a transformable second phase, its $T_0$ may cover an even higher temperature range. Multiple coatings with different $T_0$ values may be applied to cover a wide range of temperatures.

For the purpose of promoting further understanding and appreciation of the present invention and its advantages, the following examples are provided. It will be understood, however, that these examples are illustrative and not limiting in any fashion.

EXAMPLE 1

Preparation of a Laminate Having β-cristobalite Interphase (1) Preparation of Powder and Laminate Amorphous-type, β-cristobalite powder was prepared by the solution-polymerization technique employing PVA solution as a polymeric carrier. A clear sol was prepared from Ludox AS-40 colloidal silica (40 wt % suspension in water, Du Pont Chemicals, Wilmington, Del.); $Al(NO_3)_3.9H_2O$ (reagent grade, Aldrich Chemical Co., Milwaukee, Wis.) and $Ca(NO_3)_2.4H_2O$ (reagent grade, Aldrich Chemical Co., Milwaukee, Wis.) in proportions to form a final composition of CaO: 2 $Al_2O_3$: 80 $SiO_2$. After dissolving these regents in DI water, the organic carrier, PVA solution, was added and the mixture was heated. The PVA solution was prepared from 5 wt % PVA (degree of polymerization-1700, Air Products and Chemicals, Inc., Allentown, Pa.) dissolved in water. The proportions of the PVA to cation sources in the solution were adjusted in such a way that there were four times more positively charged valences from the cations than the negatively charged functional ends of the organics. As the viscosity increased by evaporation of water, the mixture was vigorously stirred. The remaining water was then dried, converting the gel into a solid. Finally, the precursor was finely ground and calcined at 750° C. for 1 hr. The calcined powder was ball milled with zirconia (3Y-TZP) media from Tosoh Inc. of Japan for 12 hr. Isopropyl alcohol was used as a solvent for milling. To observe the critical grain size, the ball-milled powder was uniaxially pressed at 20 MPa followed by iso-static pressing at 170 MPa for 10 min. The pellet-shaped green compacts were hot pressed by loading them in a graphite die and surrounding them with compatible oxides. Hot pressing was done under an argon atmosphere at 28 MPa, at a temperature of 1200° C. for 1 hr. After hot pressing, the samples were annealed in air at 1300° C. for various times. Some stress-induced transformation was achieved by hand grinding the hot-pressed and annealed specimens on a #800 mesh SiC paper.

Amorphous-type cordierite powder was also prepared by the same method. The cordierite powder was synthesized from $Mg(NO_3)_2.6H_2O$ (reagent grade, Aldrich Chemical Co., Milwaukee, Wis.); $Al(NO_3)_3.9H_2O$ (reagent grade, Aldrich Chemical Co., Milwaukee, Wis.) and Ludox AS-40 colloidal silica (40 wt % suspension in water, Du Pont Chemicals, Wilmington, Del.). Commercial mullite powder (KM Mullite-101 Kyotitsu, Nagoya, Japan), which had an average particle size of 0.3 μm and a specific surface area of 26 $m^2$/g, was used in the mullite/cordierite mixture.

The mullite-cordierite mixtures having different cordierite content were characterized for relevant properties such as thermal expansion coefficient, flexural strength with hot-pressed samples.

Figure 2:
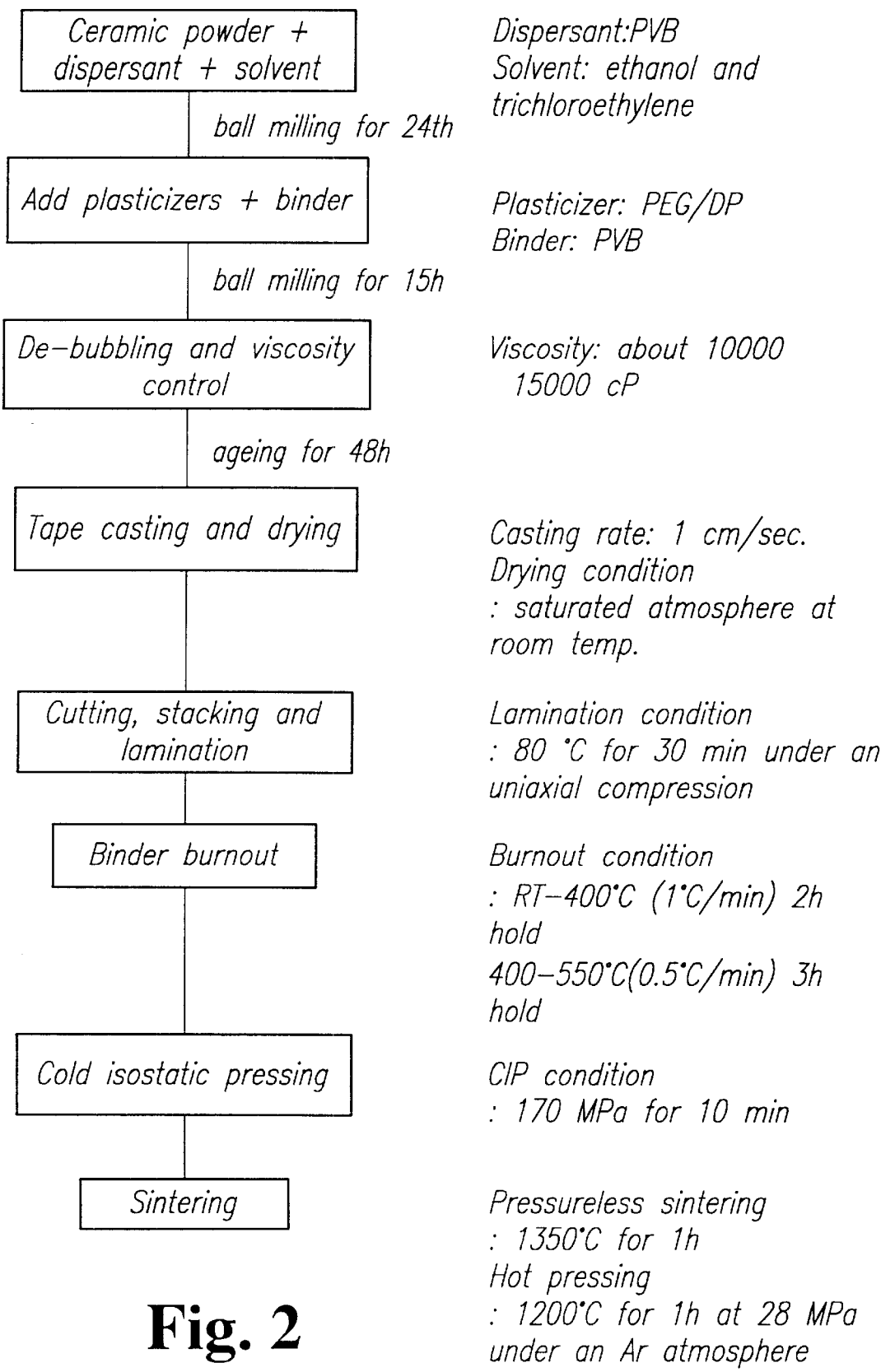
FIG. 2 is a schematic illustrating the process to fabricate laminates according to the present invention.

Laminates were fabricated by the tape casting process according to the procedure summarized in FIG. 2. The slurries consisted of 25 vol % oxide powders, 63 vol % solvent and 12 vol % organics. The 0.5 wt % (dry weight basis of oxide powder) polyvinyl butyral (PVB, Monsanto, St. Louis, Mo.) was added to the slurries as a dispersant. The solvent was composed of a mixture of trichloroethylene ($ClCH=CCl_2$, Aldrich Chemical Co., Milwaukee, Wis.) and ethanol ($CH_3CH_2OH$, Aldrich Chemical Co., Milwaukee, Wis.) while the organics included a binder (polyvinyl butyral (PVB), Monsanto, St. Louis, Mo.) and plasticizers (polyethylene glycol (PEG) 2000 and dioctyl phthalate (DP), Aldrich Chemical Co., Milwaukee, Wis.). After pulverization, dispersion and mixing by ball-milling two times, the slurries were stirred in vacuum. This helped in removing bubbles and adjusting the working viscosity. After aging for two days, the slurries were tape cast using a doctor blade opening of 150–300 μm to obtain tape cast green sheets of 60–150 μm thickness. Drying of the cast tapes was carried out under a saturated solvent atmosphere for one day.

The green laminate composites had area dimensions of 25 mm×51 mm after stacking green sheets. Thermocompression was performed at 10 MPa load for 30 min at 80° C., which was the softening point of the organics. The organic additives were removed by heating to 500° C. in an air atmosphere, using a two-step heating process. After these additives were burned out, the laminated green bodies were hot pressed in the same way as mentioned earlier.

All laminated composites after densification had a 30-layer repetitive sequence of matrix and interphase. These were made in a separately optimized 5:1 thickness ratio of matrix to interphase, by stacking each green sheet. After hot pressing, the laminates were cut into bend bars. The cutting direction was along the longitudinal axis of the specimens in the plane of lamination. The bend bars with dimensions of 30 mm×3.0 mm×2.5–3.0 mm were polished to a 15 μm finish with diamond paste. The specimens were then annealed at 1300° C. for different times.

(2) Characterization (A) Specific Surface Area Measurement: The specific surface area of the calcined powders and ball-milled powders were compared by nitrogen gas absorption (Model ASAP 2400, Micromeritics, Norcross, Ga.).

(B) Thermal Expansion Coefficient Measurement: The variation of thermal expansion coefficient for polycrystalline cristobalite and mullite-cordierite mixtures were examined using a dilatometer (Netzsch Dilatometer, 402E, German), heating up to 1100° C. at a heating rate of 5° C./min. In the mullite/cordierite mixture, to obtain a relative density of above 95% in each specimen, the specimens had to be sintered at different temperatures.

(C) Relative Density Measurement: The density for the sintered specimens was estimated by the Archimedes' method using distilled water as a displacement liquid. The relative density of each specimen was calculated from the theoretical density of mullite (3.18 g/$cm^3$), cordierite (2.52 g/$cm^3$) and cristobalite (α phase: 2.33 g/$cm^3$, β phase: 2.26 g/$cm^3$).

(D) Average Grain Size Measurement: The average grain size of sintered and annealed cristobalite was analyzed according to the Jefries-Saltykov method.

(E) X-ray Diffraction Analysis: The development of crystallinity in calcined, amorphous-type cristobalite powder and the phase change between α and β-cristobalite for hot-pressed samples were studied as a function of heating temperature and annealing time using a Rigaku x-ray diffractometer (DMax automated powder diffractometer, Rigaku/USA, Danvers, Mass.) with CuKα radiation (40 kV, 40 mA). All XRD data was obtained at room temperature after furnace cooling. The relative volume ratios of α and β-cristobalite phases were determined by integrating the X-ray peak areas of (102) of α-cristobalite and (222) β-cristobalite by the equation 1:

$$V\alpha=[I(102)\alpha/I(222)\beta+I(102)\alpha)]\times 100 \qquad (1)$$

in which, $V_\alpha$ was volume fraction of α-cristobalite, $I(102)_\alpha$ and $I(102)_\beta$ were peak intensity of (102)α and (222)β respectively.

(F) Flexural Test: Four-point flexural testing was performed using a 10 mm inner span and a 20 mm outer span, at a crosshead speed of 0.01 mm/min on a universal testing machine (model 4502, Instron Corp., Canton, Mass.). A minimum of five bars was tested for each composition. The apparent work of fracture was obtained by dividing the area under the load-displacement curve by the cross-sectional area of the sample.

(G) Indentation Test: A Vicker's hardness test was carried out with a micro-hardness tester (Zwick 3212, Mark V Lab. Inc.) under a 6 kg indentation load in order to study crack propagation profiles and interaction with the microstructure.

(H) Microstructure Characterization: The microstructure of sintered cristobalite and the crack propagation behavior in the laminates after bend testing were observed by optical microscopy (Nikon SMZ-2T, Japan) and scanning electron microscopy (SEM, Model DS-130, International Scientific Instruments, Santa Clara, Calif.). To observe grain size and cracking, polished and then annealed samples were chemically etched in boiling phosphoric acid for 30 sec.

(3). Results (A) Powder Analysis and Development of Crystalline Phases

The calcined, amorphous-type cristobalite powder was very soft, with a particle size range of 10 $\mu$m–60 $\mu$m. After ball-milling, the powder had a quite narrow particle size distribution and small particles of approximately 0.1–0.4 $\mu$m in size. The as-calcined powder had a BET specific surface area of 25 m$^2$/g. The high specific surface area meant that the calcined powder was very porous. The ball-milled powder had a specific surface area of 75 m$^2$/g. The average particle size of the amorphous-type cordierite powder, after calcination at 750° C. for 1 h and ball-milling for 12 hr., was about 0.3 $\mu$m with a specific surface area of 80 m$^2$/g.

Figure 3:
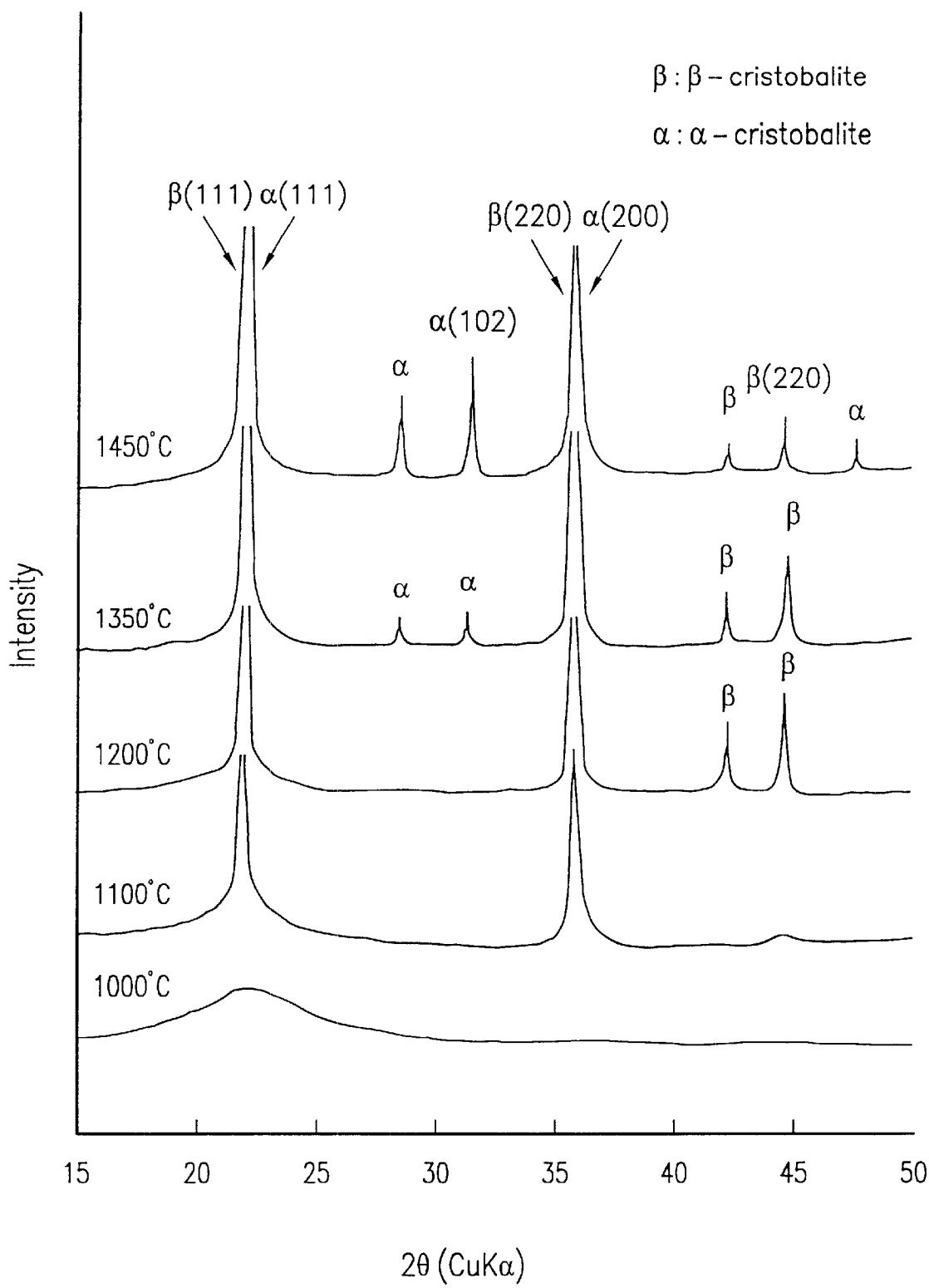
FIG. 3 is a room temperature XRD spectrum of an amorphous-type, cristobalite starting powder which crystallizes at various heating temperatures.
Figure 4A:
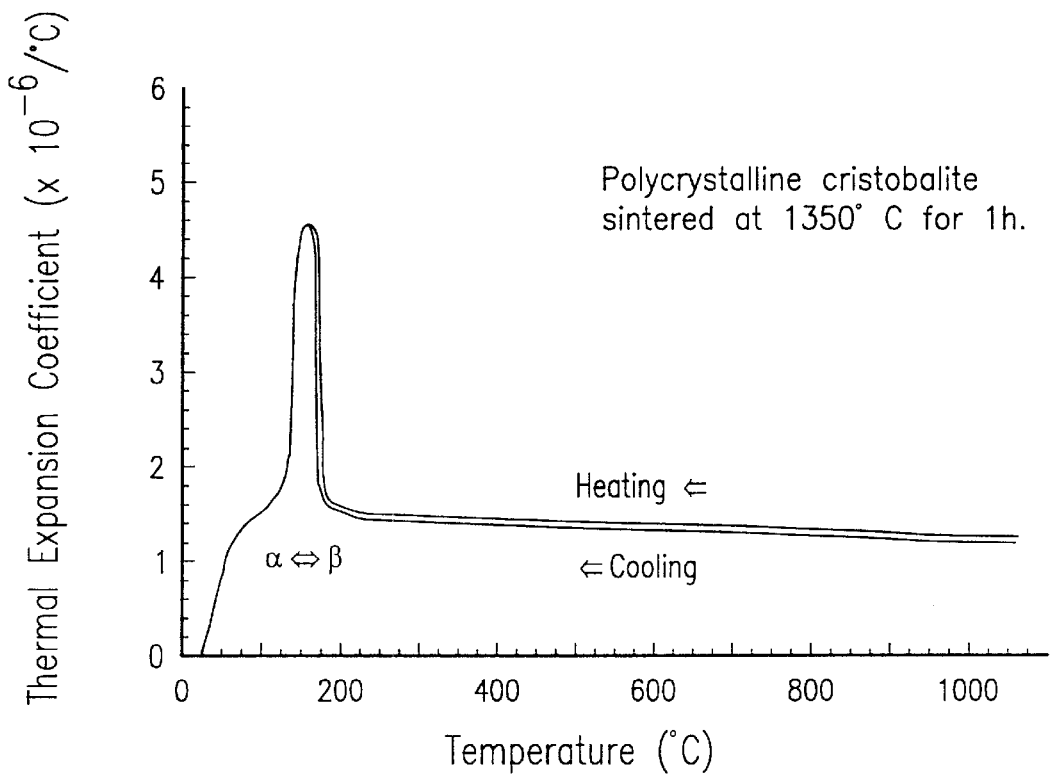
FIG. 4A is a graph of the dilatometry curve for stabilized polycrystalline cristobalite sintered at 1350° C.
Figure 4B:
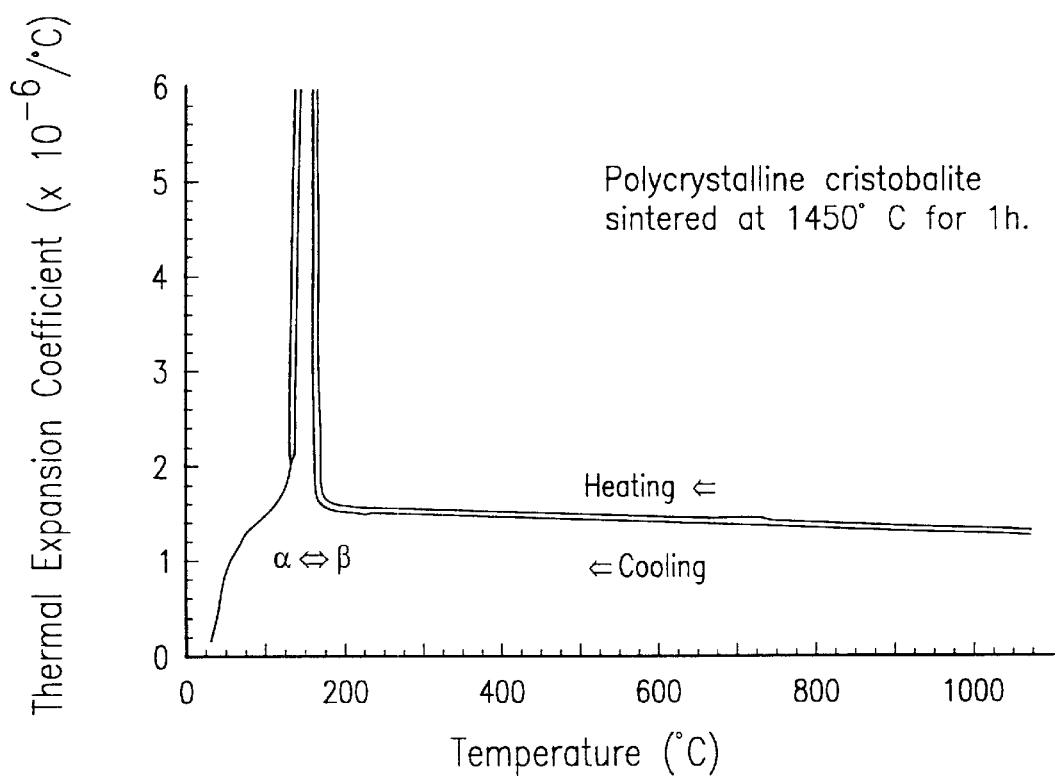
FIG. 4B is a dilatometry curve for polycrystalline cristobalite sintered at 1450° C.

Room temperature XRD spectra following the development of crystalline phases of the calcined, amorphous-type cristobalite powder at various heating temperatures is shown in FIG. 3. An amorphous phase was observed at 1000° C. Above 1100° C., the $\beta$-cristobalite phase was detected and $\beta$-cristobalite peaks were developed almost completely at 1200° C. With increasing temperature, the amount of $\beta$-cristobalite phase increased gradually, while the amount of $\alpha$-cristobalite decreased. At 1450° C., $\beta$-cristobalite remained as a minor phase in the $\alpha$-cristobalite matrix. The $\alpha$ form at high temperature was due to the spontaneous transformation resulting from the large particle size. Dilatometry curves for the stabilized cristobalite are shown in FIGS. 4A and 4B. The $\alpha \leftrightarrows \beta$ transformation occurred at 180° C. on heating and at 170° C. on cooling. The transformation temperature was lower than that of pure cristobalite because of the dopant effects. As the graphs show, the thermal expansion coefficient of $\beta$-cristobalite was approximately 1.5×10$^{-6}$/° C. and tended to decrease on heating. A change in thermal expansion coefficient was observed at the $\alpha \leftrightarrows \beta$ transformation temperature. The transformation of cristobalite results in a large increase in the thermal expansion coefficient. This change was much less for the polycrystalline cristobalite sintered at 1350° C. than the one at 1450° C. The difference in the change of thermal expansion coefficient was attributed to the $\alpha$-cristobalite content. In the case of the polycrystalline cristobalite sintered at 1350° C., $\alpha$-cristobalite was present in the $\beta$-cristobalite matrix whereas, for the polycrystalline cristobalite sintered at 1450° C., the $\alpha$-cristobalite was the matrix phase (FIG. 3). The amorphous-type cordierite powder crystallized to $\alpha$-cordierite at around 1250° C.

(B) Optimum Grain Size.

Figure 5:
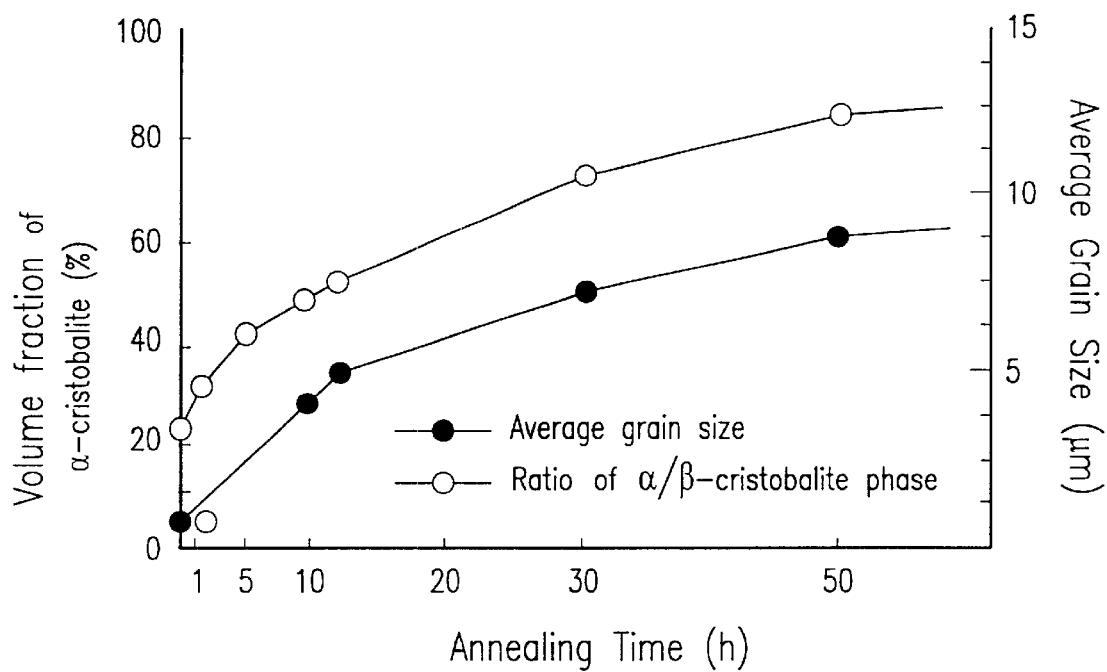
FIG. 5 is a graph comparing the volume fraction of alpha cristobalite and average grain sized for hot-pressed cristobalite samples as a function of annealing time.

The formation of a-cristobalite on cooling was affected by varying the grain size. Spontaneous transformation from $\alpha$ phase to $\beta$0 occurred at larger grain sizes. In contrast, a small $\beta$-cristobalite grain size stabilized the $\beta$ phase. The grain size of the stabilized $\beta$-cristobalite was controlled by annealing time. FIG. 5 shows the plot of volume fraction of $\alpha$-cristobalite and average grain sizes for hot-pressed cristobalite samples as a function of annealing time. It was impossible to compare the intensity of the (111) and (220) peaks from $\beta$-cristobalite with the (101) and (200) peaks from $\alpha$-cristobalite, which are the high intensity peaks of the cristobalite system, because the peaks were located at almost the same 2θ value. Therefore, the relative amount of $\alpha$ and $\beta$-cristobalite phase was compared from the relative intensity of (102)$_\alpha$ and (222)$_\beta$ peaks.

Figure 6:
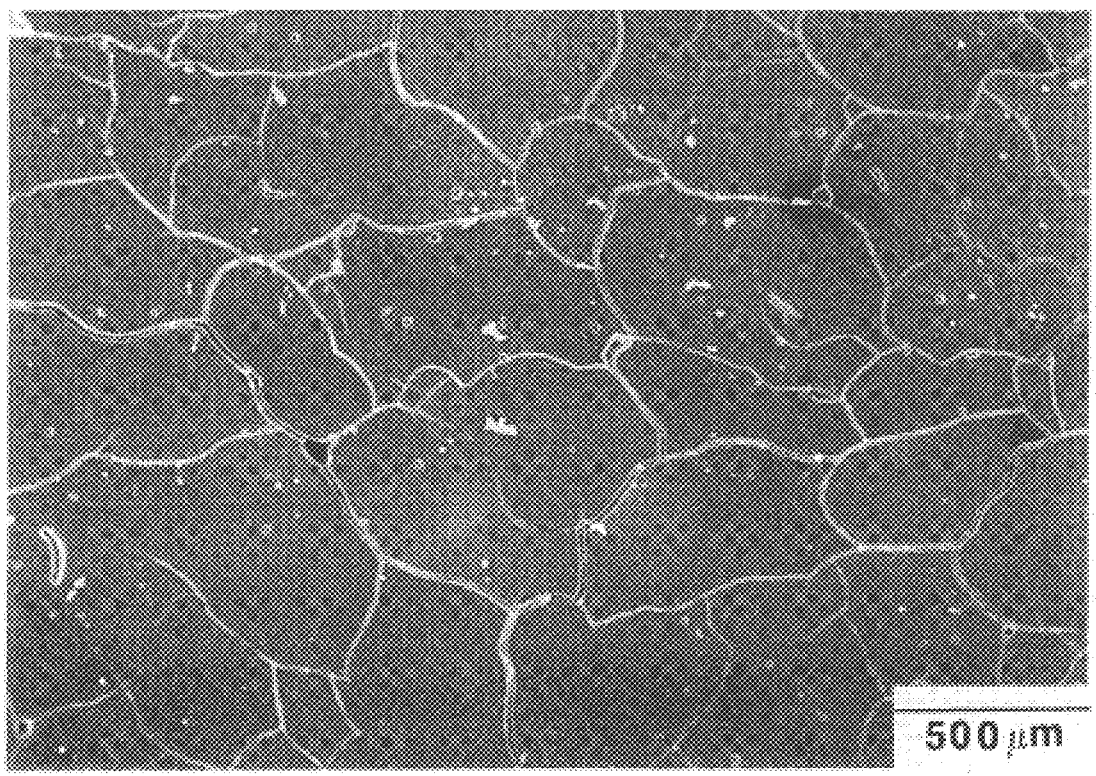
FIG. 6 is a SEM micrograph of a cristobalite sample, which was hot pressed and annealed for 50 hours.
Figure 7A:
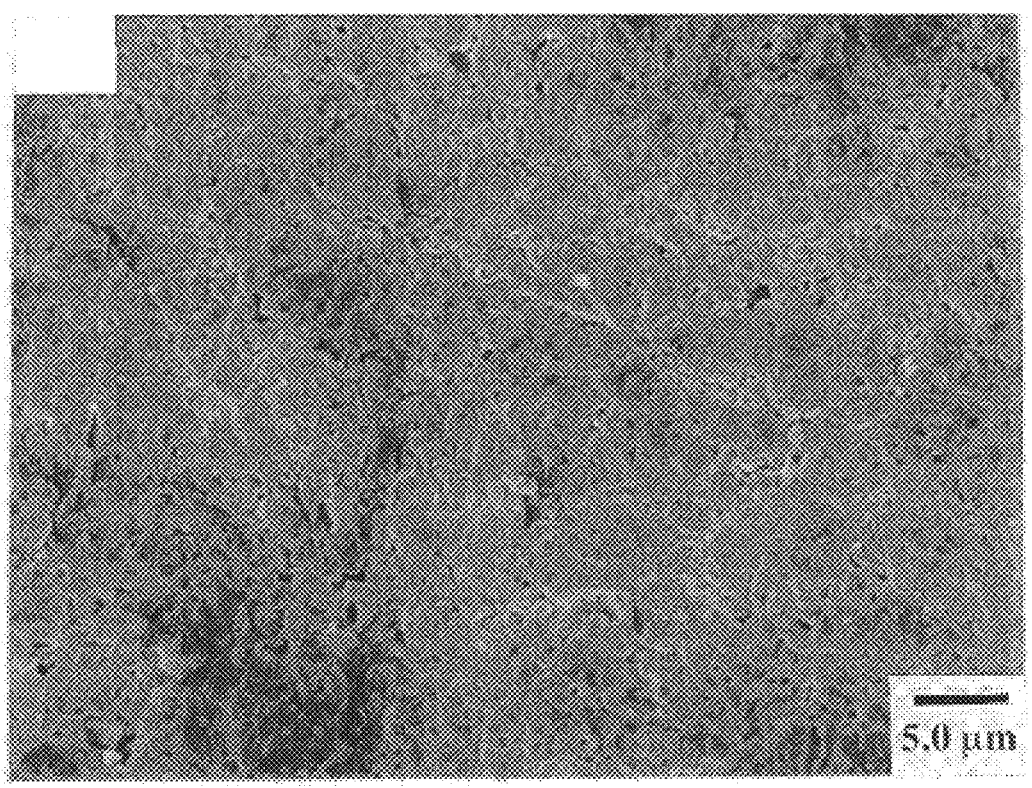
FIG. 7A is a SEM micrograph of a cristobalite sample, which was hot pressed and annealed for 0 hours.
Figure 7B:
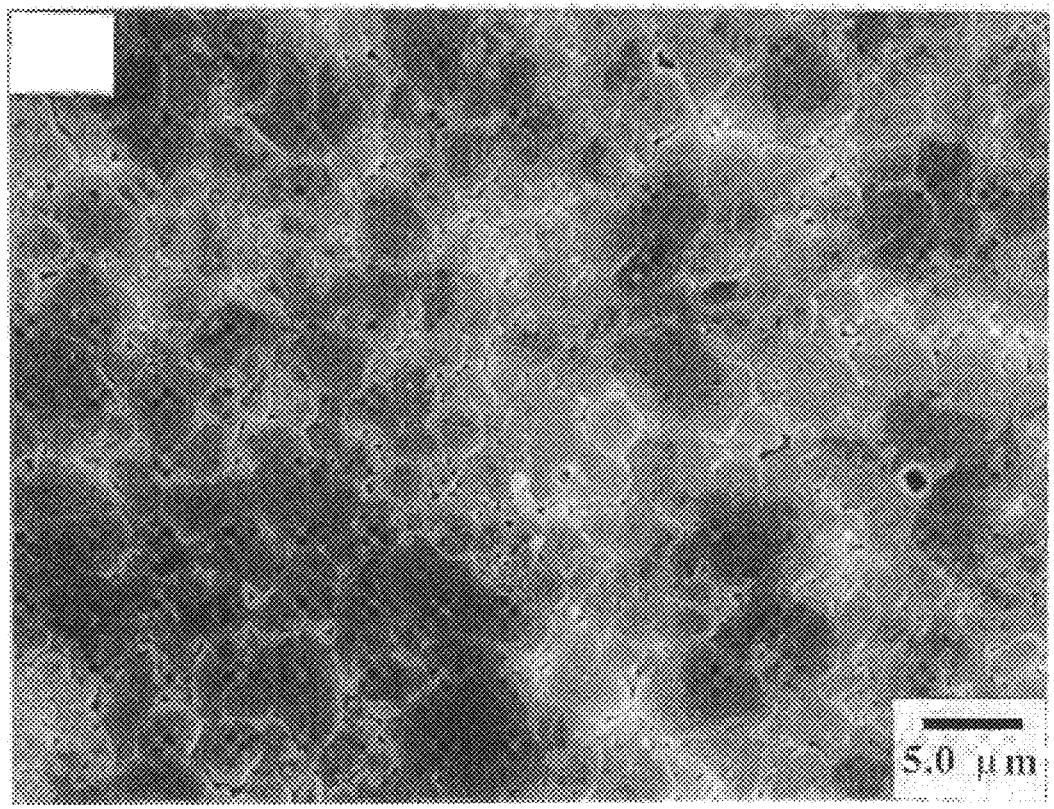
FIG. 7B is a SEM micrograph of a cristobalite sample, which was hot pressed and annealed for 10 hours.
Figure 7C:
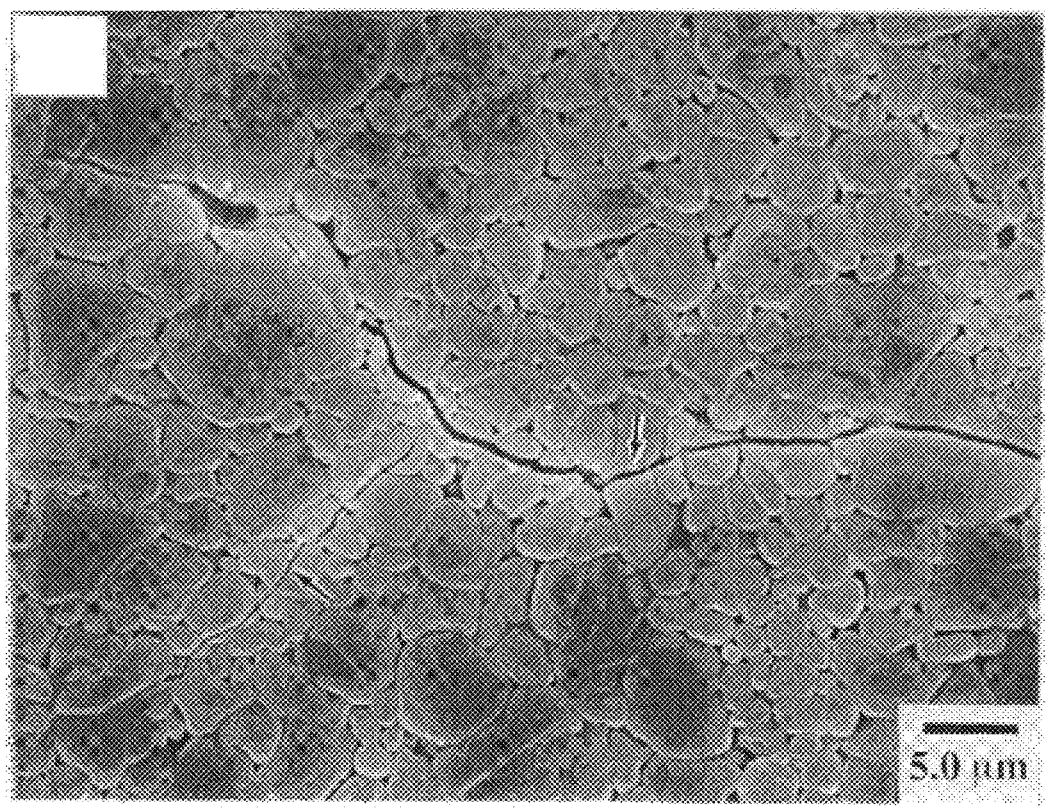
FIG. 7C is a SEM micrograph of a cristobalite sample, which was hot pressed and annealed for 12 hours.
Figure 7D:
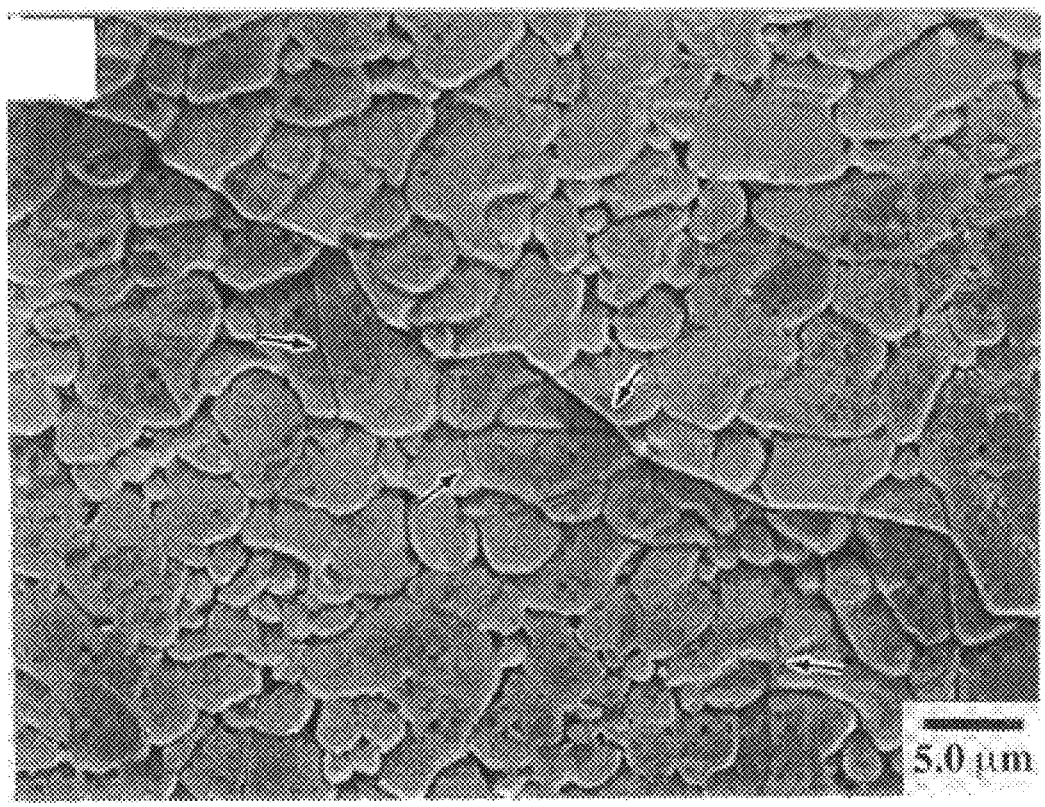
FIG. 7D is a SEM micrograph of a cristobalite sample, which was hot pressed and annealed for 30 hours.

In general, the relative volume ratios of $\alpha$ and $\beta$-cristobalite phases and the average grain size showed an increase with increasing annealing time. The increase continued up to the annealing time of 50 hr. The rate of grain growth decreased gradually from 12 hr. annealing time onwards. Large grain sizes of about 8.5 $\mu$m at an annealing time of 50 h resulted in fragile samples with extensive cracks. This was because the thermally induced transformation occurred spontaneously primarily due to the critical size effect. The sample annealed for 50 hr. showed almost 80 vol % $\alpha$-cristobalite. FIG. 6 is a SEM micrograph of the fragile cristobalite sample, which was hot-pressed and annealed for 50 hr. Extensive cracks were observed over the whole area.

The polished surface micrographs of cristobalite annealed at various times as shown in FIGS. 7A, 7B, 7C and 7D. Some cracks were detected in the microstructure having an average grain size of 5 $\mu$m, at annealing times of 12 hr. The hot-pressed cristobalite annealed for 30 hr. consisted of about 72% $\alpha$-cristobalite as shown in FIG. 5. It also exhibited cracks in the microstructure with an average grain size of 7 $\mu$m.

Figure 8:
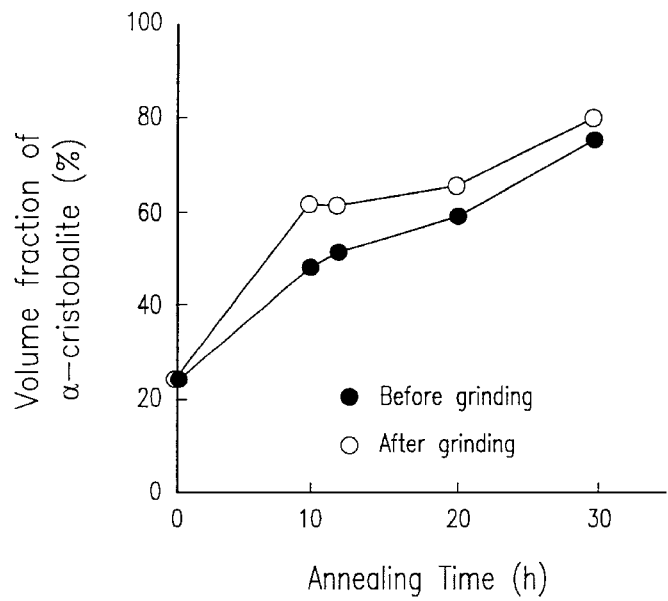
FIG. 8 is a graph of a volume fraction of alpha cristobalite and average grain sizes for hot-pressed, hand-ground cristobalite.

The transformation of $\alpha$ to $\beta$ cristobalite was susceptible to the influence of stress. Shear stress-induced $\beta \rightarrow \alpha$-cristobalite conversion for annealed and ground specimens at various annealing times are compared with the un-ground specimens. It is recognized that grinding involves a complex stress state. Furthermore, displacive transformations can be induced by shear deformation that can be induced by grinding. This has been widely demonstrated in ceramics such as zirconia and in enstatite. The mineral rhombohedral calcite (CaCO$_3$), for example, can be cyclically transformed to orthorhombic aragonite by repeated grinding in a planetary mill. FIG. 8 displays the result for hand-ground cristobalite. In view of the Gaussian distribution of grain sizes around the critical particle size for shear-induced transformation, the two effects of shear induced and thermally induced transformation are superimposed. However, the tendency exists for an increase in stress-induced $\alpha$-phase with increasing annealing time up to a maximum. Specifically, a maximum increase of about 17 vol % $\alpha$-cristobalite was calculated in the polycrystalline sample annealed for 10 hr. This indicates that the optimum range of critical grain size for shear stress induced transformation was around 4–5 $\mu$m. The increase in the amount of $\alpha$-cristobalite in the ground specimens over that in the annealed specimens, decreased with increasing annealing time above 10 hr. This may be attributed to the fact that the amount of $\beta$-cristobalite, which can be transformed by stress, was decreased by the spontaneous thermally-induced transformation which occurred in the over-sized grains.

(C) Composition of Laminate

Table I shows the variation of thermal expansion coefficient and flexural strength for the mullite/cordierite mixtures as a function of cordierite content. As expected, the thermal expansion coefficient and flexural strength decreased as cordierite content was increased. To match the thermal expansion coefficient to the chemically stabilized $\beta$-cristobalite (1.5×10$^{-6}$/° C.), the mullite/cordierite layer should also have a low thermal expansion coefficient. The thermal expansion compatibility is an important factor in fabricating a stable laminate structure without thermal stresses at the interphase. However, in order to design a high flexural strength laminate, a low cordierite content is important.

To design a laminate composite with minimum thermal expansion difference between laminates and yet retain reasonable strength, the 40 wt % cordierite content was selected for the mullite-cordierite matrix layers.

TABLE 1

Variation of Thermal Expansion Coefficient and Flexural Strength for Mullite/Cordierite Mixture as a Function of Cordierite Content

| Cordierite Content (wt %) | 0 | 20 | 40 | 60 | 80 | 100 |
|---|---|---|---|---|---|---|
| Thermal Expansion Coefficient | 4.5 | 3.8 | 3.1 | 2.6 | 2.0 | 1.4 |
| Flexural Strength (MPa) | 220–240 | 180–240 | 150–190 | 120–160 | 90–130 | 85–120 |

(D) Fracture Behavior.

To study the fracture behavior of the laminates, the hot-pressed laminates with the same matrix to interphase thickness ratio of 5:1 were four-point flexural tested at various annealing times.

Figure 11A:
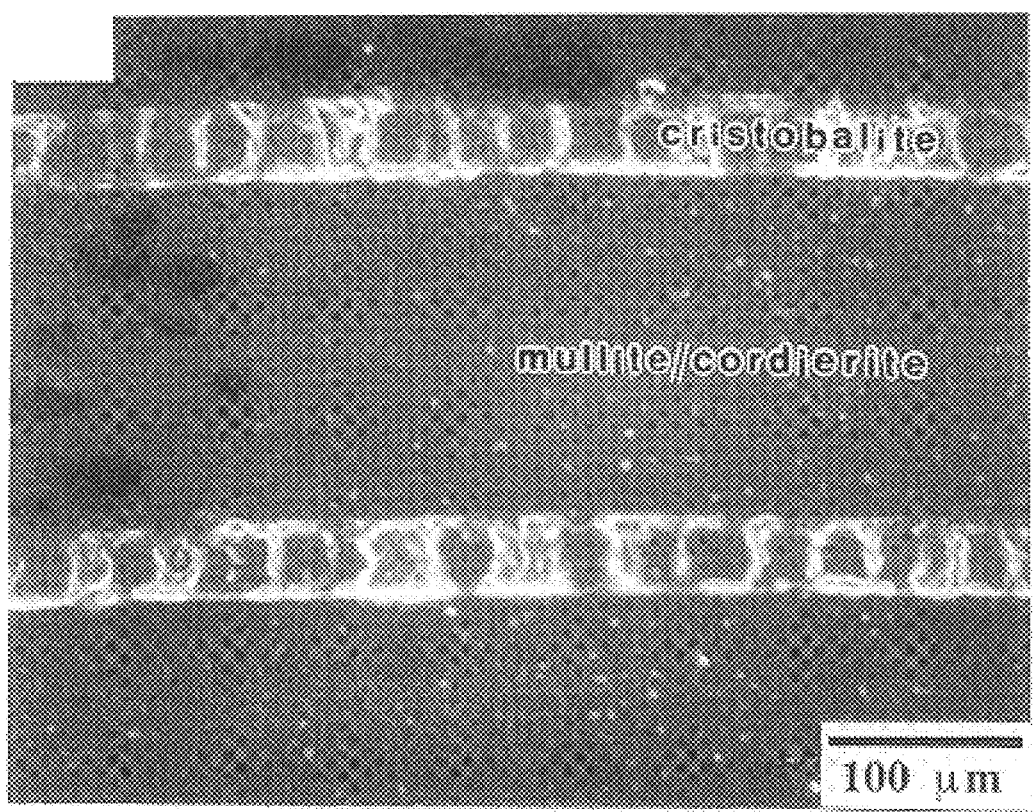
FIG. 11A is an optical micrograph depicting the crack deflection in a thermally induced crack in a hot-pressed, beta cristobalite laminate.
Figure 11B:
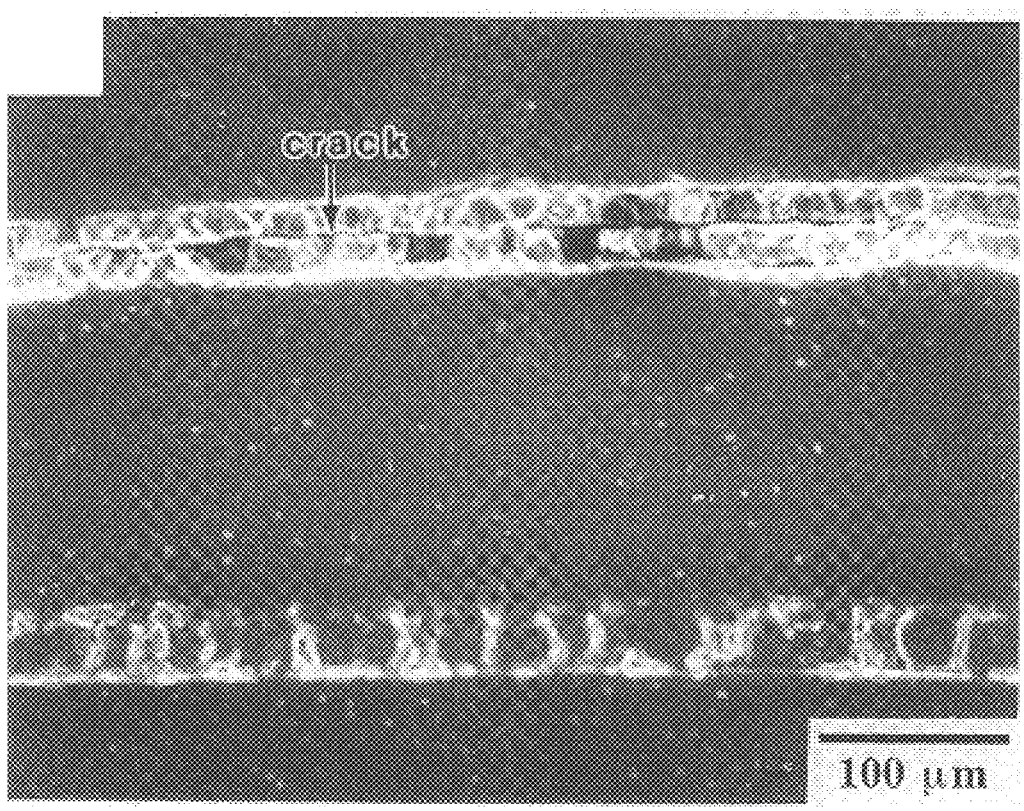
FIG. 11B is an optical micrograph depicting the crack deflection in a thermally induced crack in a hot-pressed beta cristobalite laminate.

The bulk density, volume fraction of β-cristobalite, average grain size, strength, and work of fracture for the laminates obtained at different annealing times are listed in Table II. The bulk density was not changed following annealing because the laminates were already dense enough through the hot-pressing process. The strength decreased when the annealing time was increased. The highest work of fracture of 2.38 kJ/m$^2$ was observed in the laminate with a strength of 131 MPa at annealing times 10 hr. The 10 hr. annealed sample had more metastable β-cristobalite phase ranging in the critical grain size, which can work as a crack energy dissipation and crack deflection source through shear stress-induced transformation to a greater extent than the 12 hr. annealed sample (Table 2). The 12 hr. annealed sample already had some cracks produced by the thermally induced transformation (FIGS. 7 and 11).

TABLE 2

Bulk Density, Volume Fraction of α-Cristobalite, Average Grain Size, Strength, and Work of Fracture for Hot-Pressed Laminates at Various Annealing Times

| Annealing Time | 0 | 10 | 12 | 36 |
|---|---|---|---|---|
| †Bulk Density (g/cm$^3$) | 2.68 | 2.67 | 2.63 | 2.65 |
| Volume Fraction of α-Cristobalite (%) | 22 | 47 | 52 | 77 |
| Average Grain Size | 1.2 | 4.2 | 5.0 | 7.3 |
| Strength, σ$_{max}$ (MPa) | 180 | 131 | 112 | 92 |
| Work of Fracture (kJ/m$^2$) | 1.20 | 2.38 | 2.00 | 1.82 |

†Relative density of each component in laminate composite after hot press (cristobalite: 98% cordierite: 98%, 60 wt % mullite/40 wt % cordierite mixture: 97%

Figure 9:
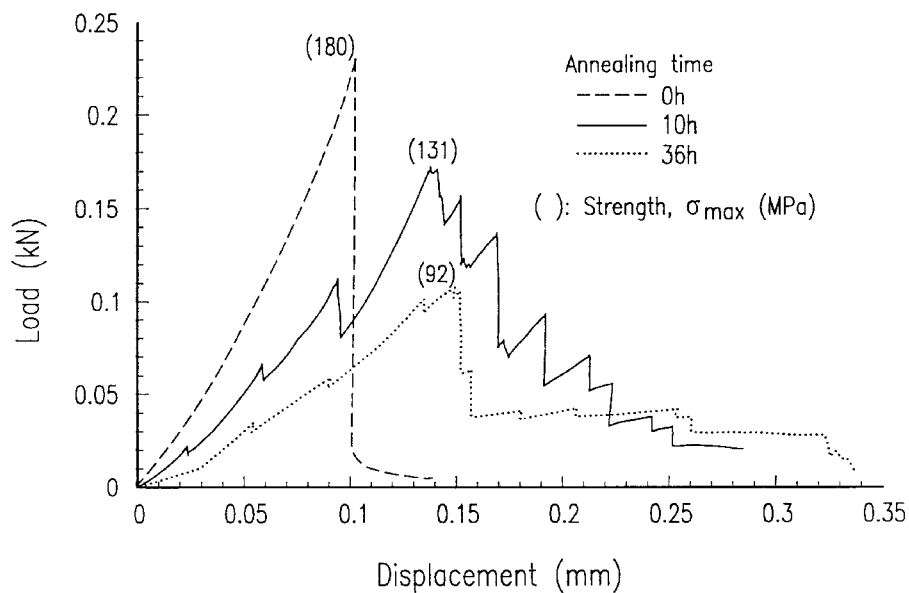
FIG. 9 is a graph illustrating the load-deflection curves for a hot-pressed laminate.
Figure 10A:
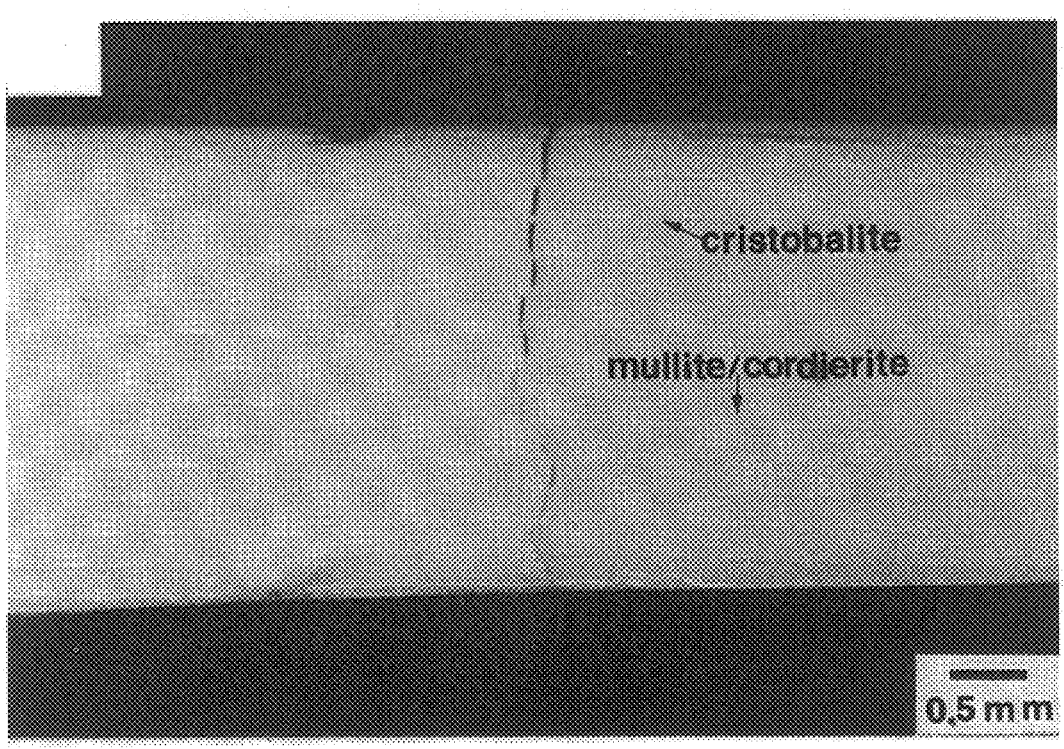
FIG. 10A is an optical micrograph depicting the crack deflection in a beta cristobalite laminate sample.
Figure 10B:
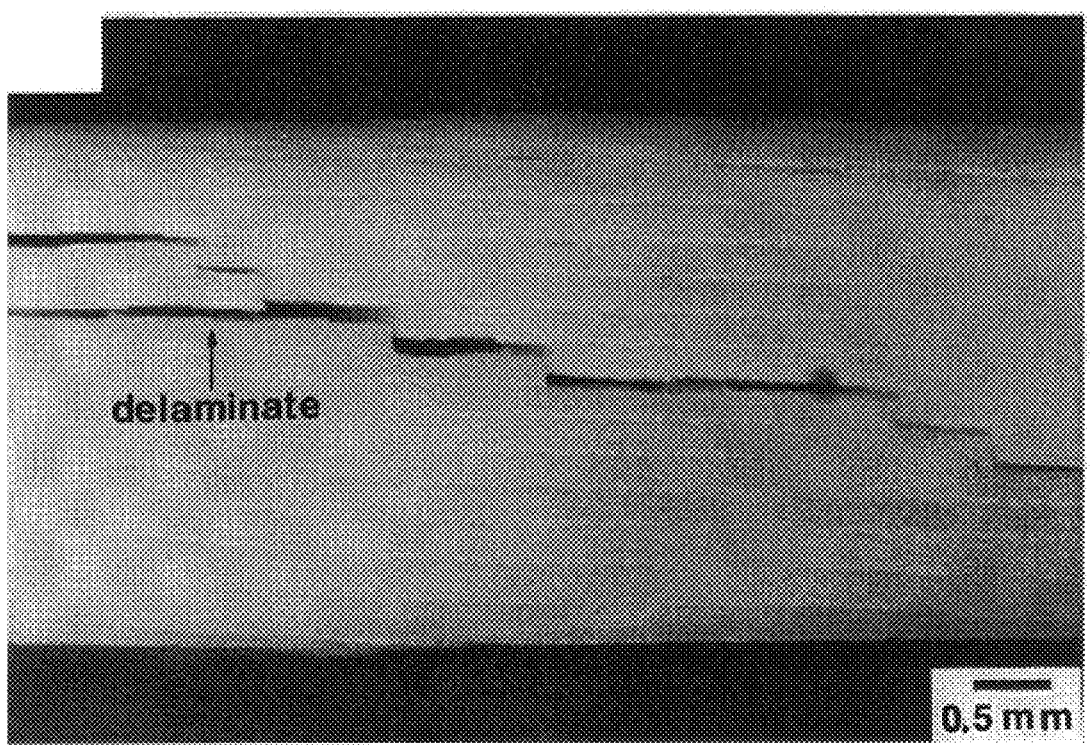
FIG. 10B is an optical micrograph depicting the crack deflection in an α-cristobalite laminate sample.

FIG. 9 presents load-deflection curves under un-notched, four-point flexural testing as a function of annealing time. For the un-annealed bend bar, the curve shows brittle fracture. For the 10 hr. annealing case, the curve showed non-catastrophic fracture. The step-wise load drops were characteristic of graceful failure. This implied that the matrix crack was debonding at the interphase, giving a relatively significant increase in work of fracture. The optical micrographs confirming crack deflection in the laminate samples are seen in FIG. 10. In comparison with the un-annealed laminate, the crack was visibly deflected along the interphase, especially in the central shear region of the cristobalite layer in the laminate annealed for 10 hr.

The thermally induced cracks in the hot-pressed laminated cristobalite layer before conducting flexural strength tests are shown in FIG. 11. In a laminate annealed for 10 hr., no severe crack existed in the cristobalite layer. In contrast, a 36 hr. annealed sample, with an average grain size of about 7.3 μm, had a severe crack inside the cristobalite layer as shown in FIG. 7. The laminate, which had the severe microcrack, showed a lower strength and work of fracture than did the laminate annealed for 10 hr. even though matrix crack deflection was observed in the flexural-tested laminate as shown in FIG. 9. The thermally induced microcracks in the cristobalite layer played the role of a crack deflector. However, this kind of crack deflection did not decrease crack propagation energy significantly in this laminate system. In contrast, the higher work of fracture in the laminate annealed for 10 h indicated that here, the crack deflection was certainly affected by shear stress-induced phase transformation, and not just by the microcracks caused by thermally induced phase transformation.

Figure 12:
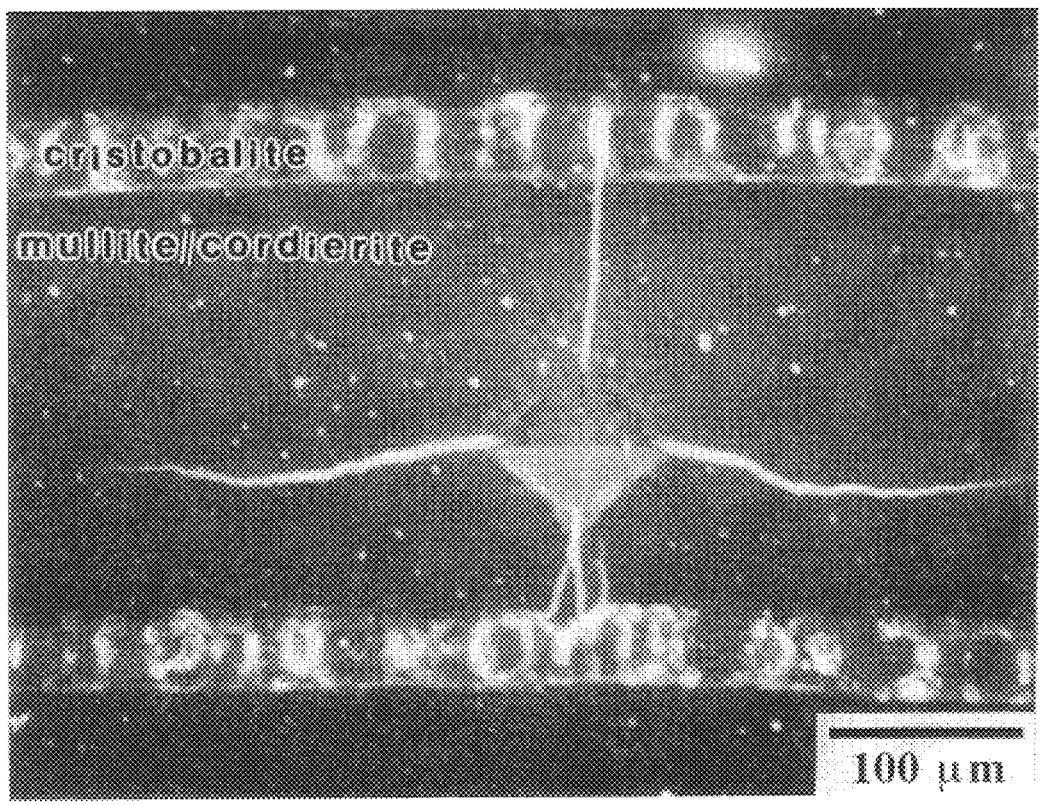
FIG. 12 is a SEM micrograph of a Vickers indent in a hot-pressed, beta cristobalite-mullite/cordierite laminate, illustrating the mechanism of crack arrest or deflection by the transformation weakened interphase.

To examine the interaction between crack propagation and the laminated microstructure, Vickers indentation cracks were introduced, and the SEM micrograph is shown in FIG. 12. Indent-induced cracks, in the laminate hot-pressed and annealed for 10 hr., displayed a preferred propagation path through the mullite-cordierite layer. However, the crack did not cross the cristobalite layer. This indicated that the indention produced cracks along the cristobalite layer by the phenomenon of transformation induced weakening.

While the invention has been illustrated and described in detail in the figures and the foregoing description, the same is considered to be illustrative and not restrictive in character, it is understood that only the preferred embodiments have been shown and described and that all changes and modifications that come within the spirit of the invention are desired to be protected.

We claim:

1. A ceramic composite comprising:
   a first ceramic matrix including at least a first ceramic material,
   a second phase including a second material, and
   an interphase material between the ceramic matrix and second phase and including a metastable ceramic compositionally stable at a temperature of at least about 1200° C. and capable of undergoing a shear-induced phase transformation having a zero volume or negative volume, unit cell shape change.

2. The ceramic composite of claim 1 wherein the first ceramic matrix includes a material selected from the group consisting of carbides, nitrides, borides and oxides.

3. The ceramic composite of claim 1 wherein the interphase material includes cations selected from the group consisting of chemical groups IA, IIA, IIIA, IVA, lanthanides and mixtures thereof.

4. The ceramic composite of claim 1 wherein the interphase material includes cations selected from the group consisting of Li$^+$, Ca$^{2+}$, Al$^{3+}$, B$^{3+}$, Mg$^{2+}$, Mn$^{2+}$, Ln$^{3+}$, Y$^{3+}$ and mixtures thereof.

5. The ceramic composite of claim 1 wherein the metastable ceramic includes β-cristobalite or β-aluminum phosphate.

6. The ceramic composite of claim 5 wherein the β-cristobalite has a median grain size of about 3.5 to about 5.5 microns.

7. The ceramic composite of claim 5 wherein the β-cristobalite includes oxides selected from the group consisting of CaO, Al$_2$O$_3$ and mixtures of thereof.

8. The ceramic composite of claim 1 wherein the second material includes a ceramic reinforcing material.

9. The ceramic composite of claim 8 wherein the ceramic reinforcing material is selected from the group consisting of fibers, particulates, platelets, whiskers and mixtures thereof.

10. The ceramic composite of claim 8 wherein the ceramic reinforcing material includes material selected from the group consisting of: ceramic oxide, mineral oxide, carbon, quartz, glass, sapphire, yttrium aluminum garnet, polycrystallized alumina-mullite, silicon carbide, mullite, forsterite, calcium aluminate, hydroxy apatite and mixtures thereof.

11. The ceramic composite of claim 1 wherein the at least one first ceramic matrix includes a material selected from the group consisting of: mullite, cordierite, alumina and mixtures thereof.

12. The ceramic composite of claim 1 comprising a laminate including a first layer and a second layer, wherein the first layer includes the first ceramic matrix and the second layer includes the second material, said interphase material forming a layer between the first layer and the second layer.

13. The ceramic composite of claim 12 wherein the second material is substantially identical to the first ceramic material.

14. The ceramic composite of claim 13 and further comprising a plurality of first and second layers.

15. The ceramic composite of claim 1 and further including a second interphase material comprising a second metastable ceramic capable of undergoing a stress induced positive volume, phase transformation.

16. The ceramic composition of claim 15 wherein the second metastable ceramic is selected from the group consisting of: $ZrO_2$, $Dy_2O_3$, $Tb_2O_3$, $2CaO.SiO_2$, $2LnO_2.Al_2O_3$ and mixtures thereof.

17. A ceramic composite prepared by a process including heat, said ceramic composite comprising:

a first ceramic matrix including at least one first ceramic material, a second phase including a second material, and an interphase material between the first and second layers and including a metastable ceramic compositionally stable when prepared by said process and capable of undergoing a shear-induced phase transformation having a zero volume or negative volume, unit cell shape change.

18. The ceramic composite of claim 17 wherein the metastable ceramic is selected from the group consisting of: β-cristobalite, β-aluminum phosphate, protoenstatite and mixtures thereof.

19. A ceramic composition comprising:

a first ceramic matrix including at least a first ceramic material;

a second phase including a second material; and an interphase material of β-cristobalite between the ceramic matrix and the second phase.

20. The composition of claim 1 wherein the metastable ceramic is capable of undergoing a displacive transformation.

21. A metastable ceramic oxide compositionally stable up to a temperature equal to about 1200° C. and capable of undergoing a displacive, shear-induced, phase transformation having a zero volume or negative volume unit cell shape change.

22. The metastable ceramic oxide of claim 21 comprising at least one cation selected from the group consisting of: chemical groups IA, IIA, IIIA, IVA, lanthanides and mixtures thereof.

23. The metastable ceramic oxide of claim 21 wherein the metastable ceramic includes β-cristobalite or β-aluminum phosphate.

24. The metastable ceramic oxide of claim 23 wherein the β-cristobalite has a median grain size between about 3.5 and about 5.5 microns.

25. The metastable ceramic oxide of claim 21 comprising a ceramic matrix.

26. The metastable ceramic oxide of claim 25 wherein the ceramic matrix comprises a material selected from the group consisting of: carbides, nitrides, borides and oxides.

27. The metastable ceramic oxide of claim 25 wherein the ceramic matrix comprises a ceramic reinforcing material.

28. The metastable ceramic oxide of claim 25 provided in a laminate.

29. A method of preparing the metastable ceramic oxide of claim 21, said method comprising:

selecting a polymorphic ceramic oxide capable of transforming from a high energy phase to a low energy phase at a transformation temperature, and annealing the polymorphic ceramic oxide for a length of time sufficient to provide the metastable ceramic oxide having an median grain size sufficient to stabilize the high-energy phase at a temperature below the transformation temperature.

30. The method of claim 29 comprising adding a doping cation to said polymorphic ceramic oxide.

31. The method of claim 29 wherein the median grain size is between about 3.5 microns and about 5.5 microns.

* * * * *